(12) United States Patent
Osaka et al.

(10) Patent No.: US 7,816,041 B2
(45) Date of Patent: Oct. 19, 2010

(54) FUEL CELL

(75) Inventors: Tetsuya Osaka, Tokyo (JP); Toshiyuki Momma, Tokyo (JP); Jong-Eun Park, Tokyo (JP)

(73) Assignees: Waseda University, Tokyo (JP); Panasonic Corporation, Kadoma-shi (JP)

( * ) Notice: Subject to any disclaimer, the term of this patent is extended or adjusted under 35 U.S.C. 154(b) by 800 days.

(21) Appl. No.: 11/515,871

(22) Filed: Sep. 6, 2006

(65) Prior Publication Data

US 2007/0054174 A1    Mar. 8, 2007

(30) Foreign Application Priority Data

Sep. 7, 2005    (JP) .............................. 2005-259469

(51) Int. Cl.
*H01M 8/00*    (2006.01)
(52) U.S. Cl. .................. 429/400; 429/428; 429/505
(58) Field of Classification Search .................. 429/12, 429/400, 428, 505
See application file for complete search history.

(56) References Cited

U.S. PATENT DOCUMENTS

2004/0028989 A1*    2/2004    Sun et al. ....................... 429/40
2004/0048111 A1    3/2004    Halme et al.

FOREIGN PATENT DOCUMENTS

| JP | 2004-165142 A | 6/2004 |
| JP | 2004-172075 A | 6/2004 |
| JP | 2005-197188 A | 7/2005 |

* cited by examiner

*Primary Examiner*—Jane Rhee
(74) *Attorney, Agent, or Firm*—Birch, Stewart, Kolasch & Birch, LLP

(57) ABSTRACT

A fuel cell includes a substrate having a pair of grooves, an electrolyte membrane lying on the substrate so as to define a pair of flow channels, and catalyst-bearing current collector layer sections disposed on the inner wall of the grooves or the inside surface of the electrolyte membrane defining the channels. A fuel liquid flows through the first channel to undergo anodic reaction, an oxidant liquid in the form of an aqueous hydrogen peroxide solution flows through the second channel to undergo cathodic reaction, and hydrogen ions traverse the electrolyte membrane.

16 Claims, 9 Drawing Sheets

ANODE

$CH_3OH + H_2O \rightarrow CO_2 + 6H^+ + 6e^-$

CATHODE

$3H_2O_2 + 6H^+ + 6e^- \rightarrow 6H_2O$ or $\begin{array}{l}3H_2O_2 \rightarrow 3H_2O + 3/2O_2\\ 3/2O_2 + 6H^+ + 6e^- \rightarrow 3H_2O\end{array}$

FUEL CELL

CROSS-REFERENCE TO RELATED APPLICATION

This non-provisional application claims priority under 35 U.S.C. §119(a) on Patent Application No. 2005-259469 filed in Japan on Sep. 7, 2005, the entire contents of which are hereby incorporated by reference.

TECHNICAL FIELD

This invention relates to a fuel cell using methanol or similar fuel liquid as the fuel and an oxidant liquid as the oxidant and capable of achieving a high current density and output density.

BACKGROUND ART

Polymer electrolyte fuel cells (PEFCs) have the potential of establishing a higher energy density than secondary batteries and are attractive as an energy source of the next generation for portable information terminals and the like. In general, fuel cells use hydrogen ($H_2$) as the fuel. Referring to FIG. 10, anodic reaction takes place to generate protons and electrons, as shown by formula (1), on the side of an anode "a" disposed on one surface of a solid polymer electrolyte "s". The protons traverse the electrolyte. The electrons move through an external circuit to a cathode "c" where cathodic reaction takes place to reduce oxygen as shown by formula (2). The overall reaction is represented by formula (3), that is, water forms from hydrogen and oxygen.

$$H_2 \rightarrow 2H^+ + e^- \quad (1)$$

$$1/2 O_2 + 2H^+ + 2e^- \rightarrow H_2O \quad (2)$$

$$H_2 + 1/2 O_2 \rightarrow H_2O \quad (3)$$

As the proton donor or fuel, for example, methanol may be used. The fuel cell using methanol is generally known as direct methanol fuel cell (DMFC). As shown in FIG. 11, the DMFC is constructed such that anodic reaction takes place on the side of anode "a" disposed on one surface of a solid polymer electrolyte "s" whereby carbon dioxide is formed from one molecule of methanol and one molecule of water as shown by formula (4), with protons and electrons being concomitantly available. On the side of cathode "c", cathodic reaction takes place to reduce oxygen as shown by formula (5). The overall reaction is represented by formula (6), that is, water forms from methanol and oxygen.

$$CH_3OH + H_2O \rightarrow CO_2 + 6H^+ + 6e^- \quad (4)$$

$$3/2 O_2 + 6H^+ + 6e^- \rightarrow 3H_2O \quad (5)$$

$$CH_3OH + 3/2 O_2 \rightarrow CO_2 + 2H_2O \quad (6)$$

With respect to the oxidant subject to cathodic reaction, gaseous oxygen is ordinarily used as mentioned above, while a supply of oxygen in the form of an oxygen dissolved solution is under investigation for use in compact-size fuel cells which are believed promising as the power supply to portable electric appliances and the like. However, a supply of oxygen saturated solution fails to feed a sufficient amount of oxygen needed by the increasing demand for greater power generation. The oxygen feed to the cathodic reaction becomes a rate controlling factor, failing to provide a satisfactory power generation capability.

When an oxygen dissolved solution having microscopic bubbles of oxygen or air dispersed therein is used for increasing the oxygen feed, problems arise in compact-size fuel cells in which the oxygen dissolved solution must pass through narrow channels. Since the channels are significantly narrow, bubbles can stagnate to clog the channel or disturb the liquid flow. This prevents transportation of protons through the solid polymer electrolyte and smooth progress of cathodic reaction.

Therefore, in connection with fuel cells of the liquid oxidant feed type which are regarded promising among compact-size fuel cells, it would be desirable to have a fuel cell capable of feeding the oxidant to the cathode at a higher efficiency than the oxidant feed capacity of conventional saturated oxygen dissolved solution.

Reference should be made of JP-A 2004-172075, JP-A 2004-165142, and JP-A 2005-197188.

DISCLOSURE OF THE INVENTION

An object of the invention is to provide a fuel cell using methanol or similar fuel liquid as the fuel and an oxidant liquid as the oxidant and capable of electricity generation at a high current density and power density.

Like the so-called direct methanol fuel cell (DMFC), the fuel cell of the invention uses a liquid as the fuel or proton donor, that is, a fuel liquid. The cell also uses a liquid as the oxidant, that is, an oxidant liquid, which is hydrogen peroxide water. Particularly in the case of a compact-size fuel cell in which narrow channels are formed as the flowpaths of fuel and oxidant liquids, the use of hydrogen peroxide water as the oxidant liquid can feed the oxidant to the cathode at a high efficiency, as compared with conventional fuel cells using saturated oxygen dissolved solution as the oxidant liquid. As a result, the current density and power density are significantly enhanced, indicating an efficient fuel cell which has never been reached in the art.

A first embodiment of the invention provides a fuel cell comprising a substrate having first and second grooves formed in juxtaposition, the grooves each having an opening and an inner wall, an electrolyte membrane lying on the substrate so as to cover the openings of the first and second grooves to define first and second flow channels, and catalyst-bearing current collector layer sections disposed on the inner wall of the first groove or the inside surface of the electrolyte membrane defining the first channel and the inner wall of the second groove or the inside surface of the electrolyte membrane defining the second channel, respectively. A fuel liquid flows through the first channel to undergo anodic reaction, an oxidant liquid flows through the second channel to undergo cathodic reaction, and hydrogen ions migrate from the first channel to the second channel through the electrolyte membrane. The oxidant liquid is an aqueous hydrogen peroxide solution.

A second embodiment of the invention provides a fuel cell comprising a first substrate having a first groove formed therein and having an opening and an inner wall, a second substrate having a second groove formed therein and having an opening and an inner wall, an electrolyte membrane sandwiched between the first and second substrates with their grooves opposed to each other, so that the membrane defines first and second channels with the first and second grooves, respectively, and catalyst-bearing current collector layer sections disposed on the inner wall of the first groove or the inside surface of the electrolyte membrane defining the first channel and the inner wall of the second groove or the inside channel, respectively. A fuel liquid flows through the first channel to undergo anodic reaction, an oxidant liquid flows through the second channel to undergo cathodic reaction, and hydrogen ions migrate from the first channel to the second channel through the electrolyte membrane. The oxidant liquid is an aqueous hydrogen peroxide solution.

In the first and second embodiments, preferably the catalyst-bearing current collector layer sections are disposed on the inner wall of the first groove and the inner wall of the second groove, respectively, and the fuel liquid and the oxidant liquid come in direct contact with the electrolyte membrane.

In preferred embodiments, the substrate is typically a silicon or resin substrate; the first and second grooves have a width of up to 1,000 μm and a depth of up to 1,000 μm; the catalyst is a metal catalyst which is typically platinum or platinum alloy; the fuel liquid is selected from the group consisting of methanol, ethanol, propyl alcohol, butanol, mixtures comprising at least one of the foregoing alcohols, and aqueous solutions of at least one of the foregoing alcohols.

The aqueous hydrogen peroxide solution preferably has a hydrogen peroxide concentration of 0.01 to 5 mol/L, and also preferably, flows through the second channel at a flow rate of 0.1 to 50 ml/min per square millimeter of the channel cross-sectional area.

As compared with prior art fuel cells using saturated oxygen dissolved solution as the oxidant liquid, the invention allows for efficient supply of the oxidant to the cathode, and as a consequence, providing a DMFC having a significantly increased current density and power density. Unlike prior art fuel cells comprising a gas diffusion layer generally formed of carbon paper as in bipolar structure fuel cells, the fuel cell of the invention avoids the phenomenon that oxygen gas produced by decomposition of hydrogen peroxide stagnates within pores in the gas diffusion layer to inhibit further supply of the oxidant liquid, and encourages efficient utilization of aqueous hydrogen peroxide solution as the oxidant.

BRIEF DESCRIPTION OF THE DRAWINGS

Refer now to the figures, which are exemplary embodiments, and wherein the like elements are numbered alike.

DESCRIPTION OF THE PREFERRED EMBODIMENTS

It should be noted that the terms "first," "second," and the like used herein do not denote any order, quantity, or importance, but rather are used to distinguish one element from another. The terms "a" and "an" herein do not denote a limitation of quantity, but rather denote the presence of at least one of the referenced item.

A first embodiment of the invention provides a fuel cell comprising a substrate having first and second grooves formed in juxtaposition, the grooves each having an opening and an inner wall, an electrolyte membrane lying on the substrate so as to cover the openings of the first and second grooves to define first and second flow channels, and catalyst-bearing current collector layer sections disposed on the inner wall of the first groove or the inside surface of the electrolyte membrane defining the first channel and the inner wall of the second groove or the inside surface of the electrolyte membrane defining the second channel, respectively. A fuel liquid flows through the first channel to undergo anodic reaction, and an oxidant liquid flows through the second channel to undergo cathodic reaction. Hydrogen ions migrate from the first channel to the second channel through the electrolyte membrane. The oxidant liquid is an aqueous hydrogen peroxide solution.

Figure 1:
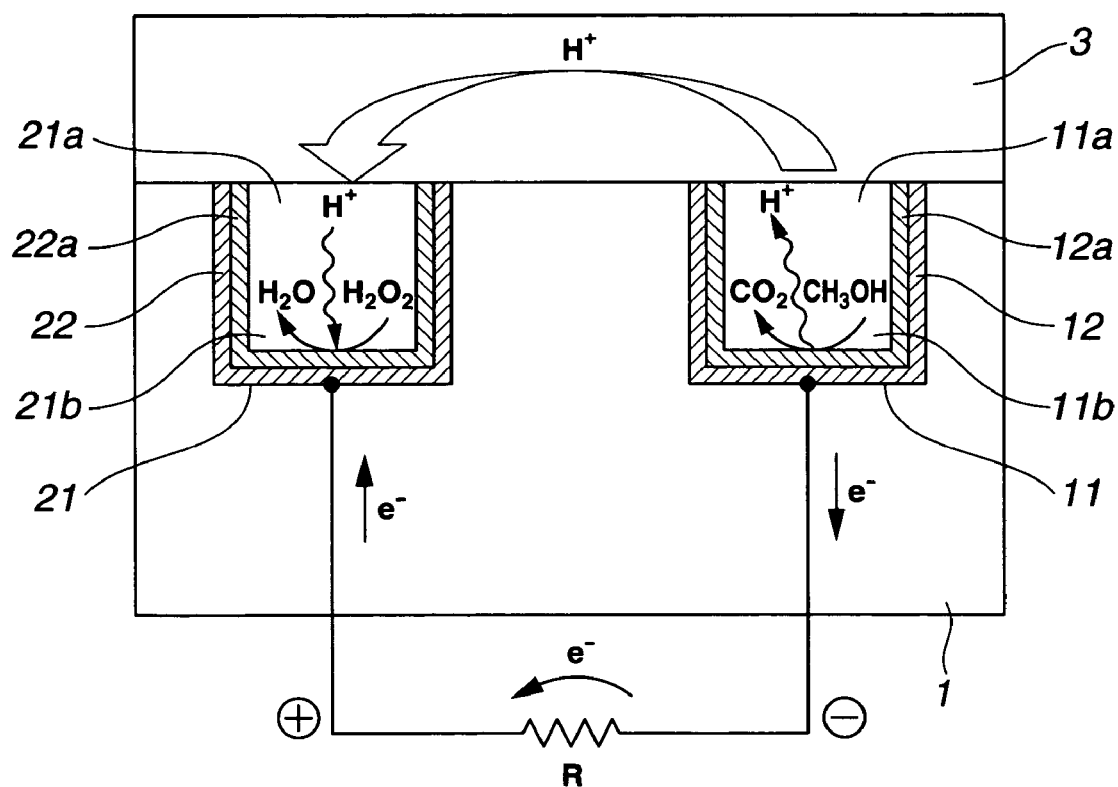
FIG. 1 is a cross-sectional view of a fuel cell according to an embodiment of the invention.

Referring to FIG. 1, an exemplary fuel cell of this embodiment is illustrated. The fuel cell include a substrate 1 having first and second grooves 11 and 21 formed in its upper surface in juxtaposition, the grooves each having an upper opening and an inner wall. An electrolyte membrane 3 lies on the substrate 1 so as to cover the openings of the first and second grooves 11 and 21. The electrolyte membrane 3 defines a first flow channel 11a with the first groove 11, and also defines a second flow channel 21a with the second groove 21. A current collector layer section (anode) 12 having a catalyst 12a supported thereon is disposed on the inner wall (including side and bottom walls) of the first groove 11 defining the first channel 11a; and another current collector layer section (cathode) 22 having a catalyst 22a supported thereon is disposed on the inner wall (including side and bottom walls) of the second groove 21 defining the second channel 21a. The current collector layer sections (anode and cathode) 12 and 22 are electrically connected to form a circuit. A fuel liquid 11b, which is methanol in this embodiment, flows through the first channel 11a to undergo anodic reaction. An oxidant liquid 21b flows through the second channel 21a to undergo cathodic reaction. Concurrently with the anodic reaction of the fuel liquid 11b and the cathodic reaction of the oxidant liquid 21b, hydrogen ions ($H^+$) migrate from the first channel 11a (fuel liquid 11b) to the second channel 21a (oxidant liquid 21b) through the electrolyte membrane 3. This fuel cell is of generally called planar type. The oxidant liquid 21b used in this fuel cell is an aqueous hydrogen peroxide solution.

A second embodiment of the invention provides a fuel cell comprising a first substrate having a first groove formed therein and having an opening and an inner wall, a second substrate having a second groove formed therein and having an opening and an inner wall, an electrolyte membrane sandwiched between the first and second substrates with their grooves opposed to each other, so that the membrane defines first and second channels with the first and second grooves, respectively, and catalyst-bearing current collector layer sections disposed on the inner wall of the first groove or the inside surface of the electrolyte membrane defining the first channel and the inner wall of the second groove or the inside surface of the electrolyte membrane defining the second channel, respectively. A fuel liquid flows through the first channel to undergo anodic reaction, and an oxidant liquid flows through the second channel to undergo cathodic reaction. Hydrogen ions migrate from the first channel to the second channel through the electrolyte membrane. The oxidant liquid is an aqueous hydrogen peroxide solution.

Figure 2:
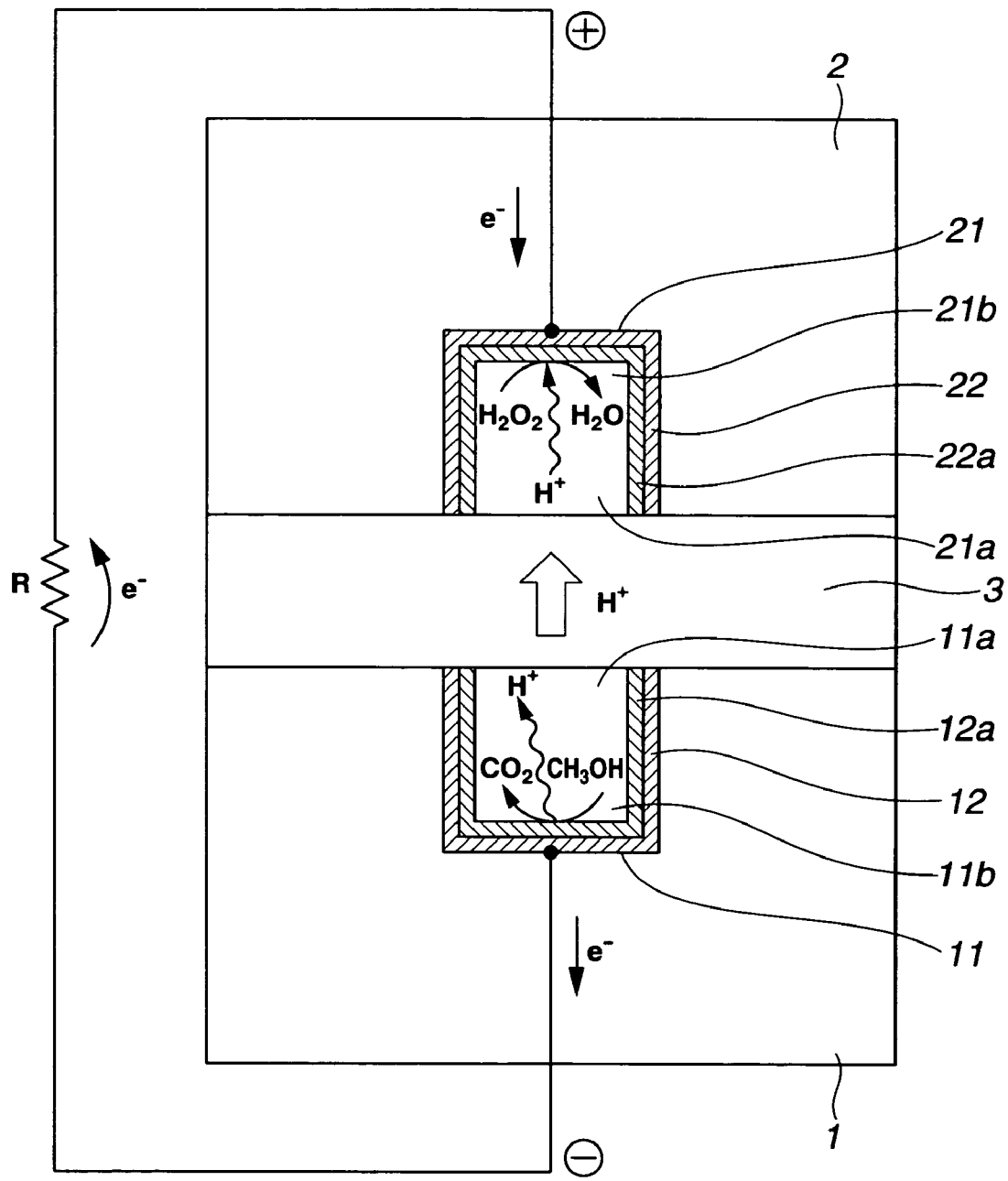
FIG. 2 is a cross-sectional view of a fuel cell according to another embodiment of the invention.

Referring to FIG. 2, an exemplary fuel cell of the second embodiment is illustrated. The fuel cell includes a first substrate 1 having a first groove 11 formed in its upper surface and having an opening and an inner wall, a second substrate 2 having a second groove 21 formed in its lower surface and having an opening and an inner wall. An electrolyte membrane 3 is sandwiched between the first and second substrates 1 and 2 with their grooves 11 and 21 opposed to each other, so that the membrane 3 closes the upper opening of the first groove 11 and the lower opening of the second groove 21. That is, the membrane 3 defines a first channel 11a with the first groove 11, and also defines a second channel 21a with the second groove 21. A current collector layer section (anode) 12 having a catalyst 12a supported thereon is disposed on the inner wall (including side and bottom walls) of the first groove 11 defining the first channel 11a; and another current collector layer section (cathode) 22 having a catalyst 22a supported thereon is disposed on the inner wall (including side and bottom walls) of the second groove 21 defining the second channel 21a. The current collector layer sections (anode and cathode) 12 and 22 are electrically connected to form a circuit. A fuel liquid 11b, which is methanol in this embodiment, flows through the first channel 11a to undergo anodic reaction. An oxidant liquid 21b flows through the second channel 21a to undergo cathodic reaction. Concurrently with the anodic reaction of the fuel liquid 11b and the cathodic reaction of the oxidant liquid 21b, hydrogen ions (H$^+$) migrate from the first channel 11a (fuel liquid 11b) to the second channel 21a (oxidant liquid 21b) through the electrolyte membrane 3. The oxidant liquid 21b used in this fuel cell is an aqueous hydrogen peroxide solution.

In both the first and second embodiments of the invention, it is preferred from the current collection aspect that current collector layer sections 12 and 22 having the catalysts 12a and 22a are disposed on the inner walls (including side and bottom walls) of the first and second grooves 11 and 21, respectively, as shown in FIGS. 1 and 2. Most preferably, the components are constructed so that the fuel liquid and the oxidant liquid come in direct contact with the electrolyte membrane, while no catalyst and current collector layer sections are formed on the surfaces of the electrolyte membrane 3 defining the first and second channels 11a and 21a.

Figure 4:
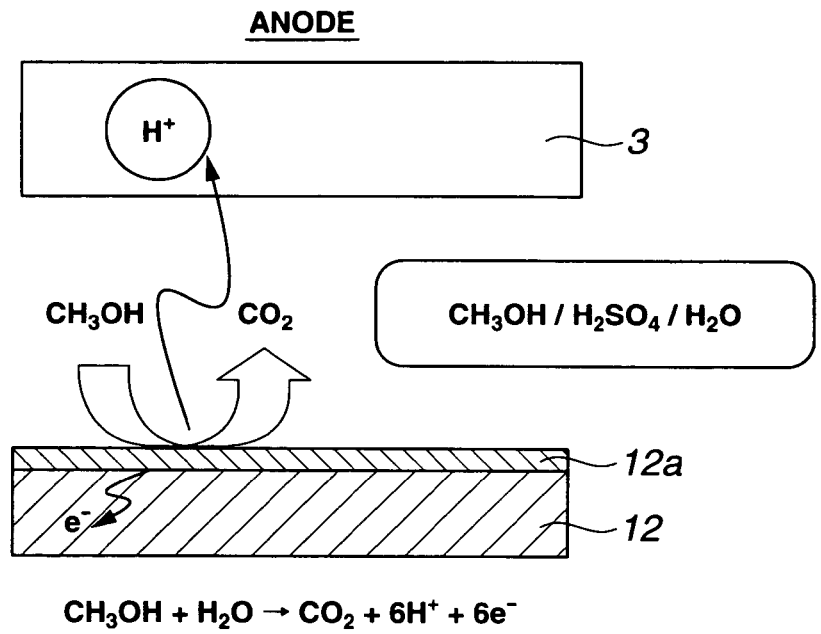
FIG. 4 schematically illustrates proton transportation on the anode side.
Figure 5:
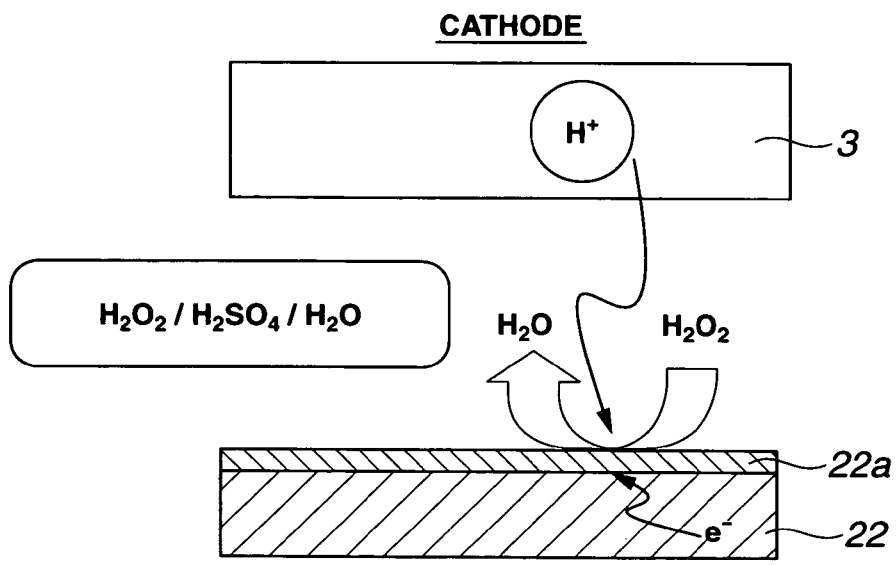
FIG. 5 schematically illustrates proton transportation on the cathode side.

FIGS. 4 and 5 schematically illustrate proton transportation in the fuel cells of the first and second embodiments as shown in FIGS. 1 and 2. FIG. 4 corresponds to the anode side where reaction as shown below:

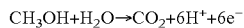

takes place. FIG. 5 corresponds to the cathode side where reaction(s) as shown below:

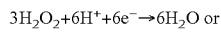

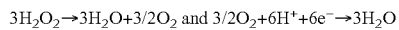

takes place. Included in FIGS. 4 and 5 are the current collector layer section (anode) 12, anode catalyst 12a, current collector layer section (cathode) 22, cathode catalyst 22a, and electrolyte membrane 3.

The fuel cells of these embodiments are advantageous in achieving a significantly high current collection efficiency because the conventional membrane electrode assembly (MEA) is not adopted. Where the catalyst is supported by the current collector layer, it can be applied by electrodeposition, for example, indicating ease of catalyst deposition. In addition, the fuel or oxidant can be contacted with the catalyst over the entire inner wall of the groove, which advantageously contributes to an improved reaction efficiency.

Figure 3:
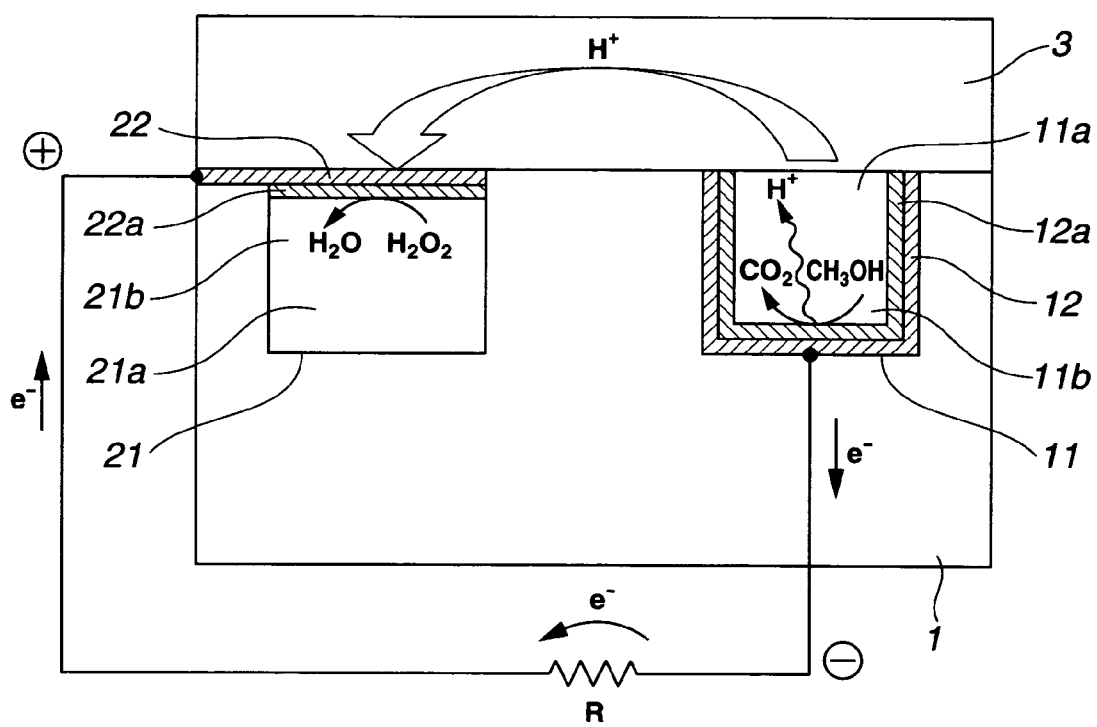
FIG. 3 is a cross-sectional view of a fuel cell according to another embodiment of the invention.

The fuel cell of the invention is not limited to the embodiments illustrated above. FIG. 3 illustrates another exemplary fuel cell as a modification of the first embodiment. The fuel cell include a substrate 1 having first and second grooves 11 and 21 formed in its upper surface in juxtaposition, the grooves each having an upper opening and an inner wall. An electrolyte membrane 3 lies on the substrate 1 so as to cover the openings of the first and second grooves 11 and 21. The electrolyte membrane 3 defines a first flow channel 11a with the first groove 11, and also defines a second flow channel 21a with the second groove 21. A current collector layer section (anode) 12 having a catalyst 12a supported thereon is disposed on the inner wall (including side and bottom walls) of the first groove 11 defining the first channel 11a; and another current collector layer section (cathode) 22 having a catalyst 22a supported thereon is disposed on the inside surface of the membrane 3 defining the second channel 21a. The current collector layer sections (anode and cathode) 12 and 22 are electrically connected to form a circuit. A fuel liquid 11b, which is methanol in this embodiment, flows through the first channel 11a to undergo anodic reaction. An oxidant liquid 21b flows through the second channel 21a to undergo cathodic reaction. Concurrently with the anodic reaction of the fuel liquid 11b and the cathodic reaction of the oxidant liquid 21b, protons (H$^+$) migrate from the first channel 11a (fuel liquid 11b) to the second channel 21a (oxidant liquid 21b) through the electrolyte membrane 3. The oxidant liquid 21b used in this fuel cell is an aqueous hydrogen peroxide solution.

The substrate used herein may be a silicon substrate, but is not limited thereto. The silicon substrate is preferred because narrow grooves can be formed therein at a high precision by micro-processing techniques commonly used in the semiconductor fabrication technology such as lithography and etching. Besides the silicon substrate, any material having strength and dimensional stability may be employed as the substrate. Resinous substrates may be used, for example, polyacrylic resins, polyimide resins, polyester resins, epoxy resins and ABS resins, and mixtures thereof, and composite materials comprising such resins and inorganic fillers.

The width and depth of the first and second grooves in the fuel cells of the invention may vary over a wide range depending on the application, size and electricity generating capacity of a particular fuel cell. For compact-size fuel cells, the grooves preferably have a width less than or equal to 1,000 μm, more preferably less than or equal to 100 μm and a depth less than or equal to 1,000 μm, more preferably less than or equal to 100 μm. Although the lower limits of the width and depth of the grooves are not critical, both are usually greater than or equal to about 10 um.

Although the shape of the first and second grooves is not particularly limited, they may be either of anisotropic shape (rectangular) or of isotropic shape (round or semicircular). The side walls of the grooves may be perpendicular to the substrate surface or tapered (so that the groove is inverse-trapezoid in cross section). When the current collector layer is formed by vapor deposition, the tapered side walls improve the deposition efficiency.

With respect to the distance between the first and second grooves, a shorter distance is preferred in the first embodiment where proton transportation occurs in plane. Since too short a distance may permit methanol migration to occur in addition to the proton migration, the distance should preferably be controlled so as to inhibit methanol migration. From the miniaturization and integration standpoint, the distance between the first and second grooves is preferably less than or equal to 1,000 μm, more preferably less than or equal to 100 μm. Although the lower limit of the distance is not critical, it is usually greater than or equal to about 1/10 of the groove width.

The current collector layer used herein is typically a laminate of a titanium layer serving as a bond layer to the groove inner wall and a gold layer serving as a conductive layer, on which a catalyst is supported. The metal of the electrode portion on which a catalyst is supported is not limited to these metals, and any metals having a current collecting function may be used.

With respect to the catalyst supported by the current collector layer, a metal functioning as an oxidizing catalyst for the fuel is used on the anode side, whereas a metal functioning as a reducing catalyst for the oxidant is used on the cathode side. The preferred metals include platinum and platinum alloys, examples of which include alloys of platinum with one or more elements selected from the group consisting of ruthenium, iridium, osmium, iron, nickel, gold, cobalt, palladium, tungsten, molybdenum, and tin. It is preferred to use a platinum-ruthenium alloy on the anode side and platinum on the cathode side because fuel cells with a high electromotive force and high power are available.

The electrolyte membrane used herein is preferably a solid polymer electrolyte membrane formed of polytetrafluoroethylene (PTFE) impregnated with a proton-conducting substance. Due to its strength, elongation, modulus, hardness and stiffness, the electrolyte of this type is advantageous in constructing the fuel cell of the invention. The preferred proton-conducting substance is a perfluorosulfonic acid-derived polymer, for example. The solid polymer electrolyte membrane used herein is commercially available, for example, as Flemion® membranes from Asahi Glass Co., Ltd. and Nafion® membranes from DuPont. The electrolyte membrane is usually about 50 μm to about 200 μm thick.

The fuel liquid passed through the first flow channel is not particularly limited as long as it is capable of donating protons. The fuel liquid is typically selected from alcohols, such as methanol, ethanol, propyl alcohol, and butanol, alone or mixtures of two or more of the foregoing alcohols, and aqueous solutions thereof. A choice may also be made of ketones such as acetone and ethers such as dimethyl ether. When the fuel liquid is used in the form of an aqueous solution, its concentration is usually 1 to 3 mol/L in the case of aqueous methanol solution, for example, though not limited thereto.

On the other hand, the invention uses an aqueous hydrogen peroxide solution as the oxidant liquid. Use of aqueous hydrogen peroxide solution as the oxidant liquid can supply the oxidant to the cathode at a high efficiency as compared with prior art fuel cells using saturated oxygen dissolved solution as the oxidant liquid. As a consequence, a fuel cell having a significantly increased current density and power density is available.

The aqueous hydrogen peroxide solution should preferably have a hydrogen peroxide concentration of 0.01 to 5 mol/L, especially 0.03 to 3 mol/L. This range of hydrogen peroxide concentration ensures a fuel cell having a significantly increased current density and power density. Also preferably, the aqueous hydrogen peroxide solution flows through the channel at a flow rate of 0.1 to 50 ml/min per square millimeter ($mm^2$) of the channel cross-sectional area, with the more preferred flow rate being in the range of 1 to 20 ml/min/$mm^2$. Outside the range, too low a flow rate may fail to supply a sufficient amount of oxidant to the cathode, or sometimes oxygen produced by decomposition of hydrogen peroxide may form bubbles within the channel for inhibiting further supply of hydrogen peroxide to the cathode. Too high a flow rate may increase the internal pressure in the channel, causing leakage.

Also preferably, an electrolyte such as sulfuric acid is preferably added to the fuel liquid and oxidant liquid in order to promote proton transportation. This ensures that protons generated within the channel are efficiently transported to the electrolyte membrane. For the passage of the fuel liquid and oxidant liquid, pumps or suitable other feed means may be used.

A fuel cell system having a high capacity or a long life can be constructed by using the cell described above as a unit and stacking a plurality of such cells. Alternatively, a fuel cell system having a high capacity or a long life can be constructed simply by forming a plurality of grooves on a common substrate, and providing electrical connections between them so as to construct a fuel cell stack.

Figure 6A:
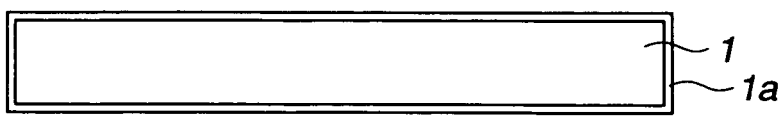
FIG. 6 schematically illustrates an early stage of a fuel cell manufacturing process.
Figure 6B:
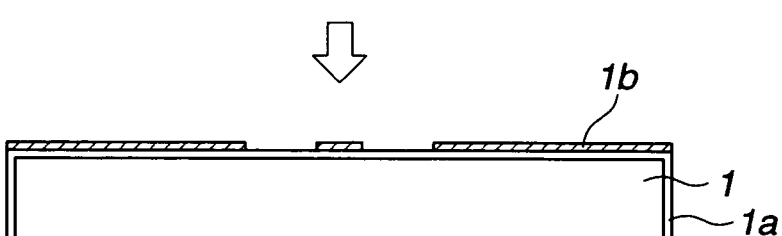
Figure 6C:
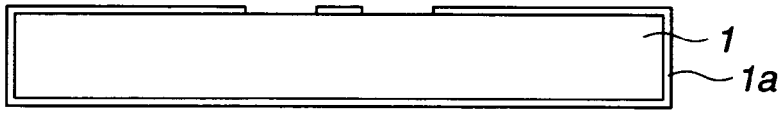
Figure 6D:
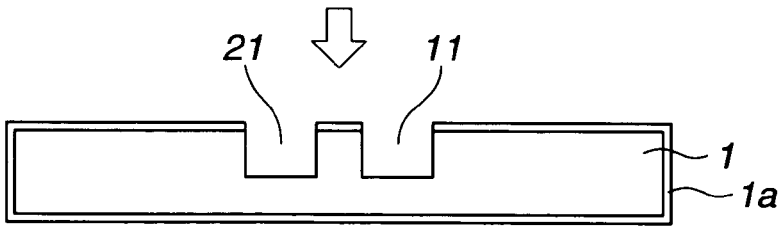
Figure 6E:
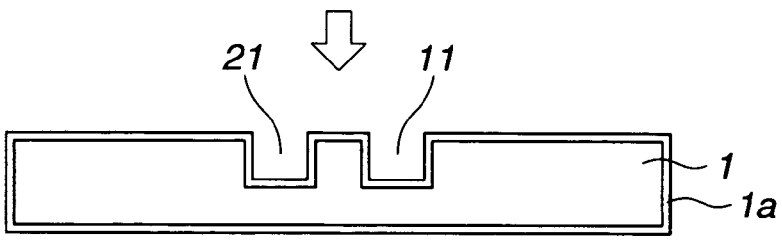

Now an exemplary process for manufacturing a fuel cell according to the invention is described by referring to the fuel cell illustrated in FIG. 1, for example. First, as shown in FIG. 6A, a substrate 1 is heat oxidized to form an oxide film 1a (thermal oxidation step). Then, as shown in FIGS. 6B and 6C, the oxide film 1a on the substrate 1 is patterned by forming a resist 1b and etching through the resist 1b (lithography and oxide film etching steps). Next, as shown in FIGS. 6D and 6E, a deep-RIE resist pattern is applied, first and second grooves 11 and 21 are formed using a reactive ion etching (RIE) apparatus, and the resist is then removed, followed by thermal oxidation (silicon etching or groove forming and thermal oxidation steps).

Figure 7F:
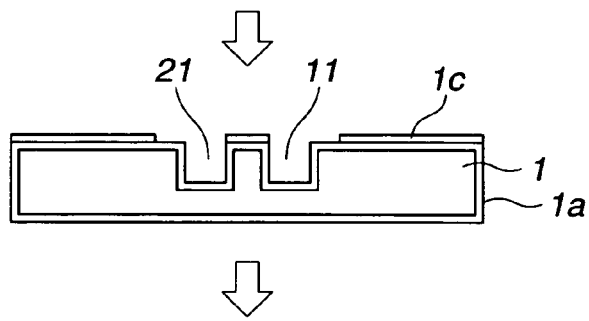
FIG. 7 also schematically illustrates a later stage of the fuel cell manufacturing process.
Figure 7G:
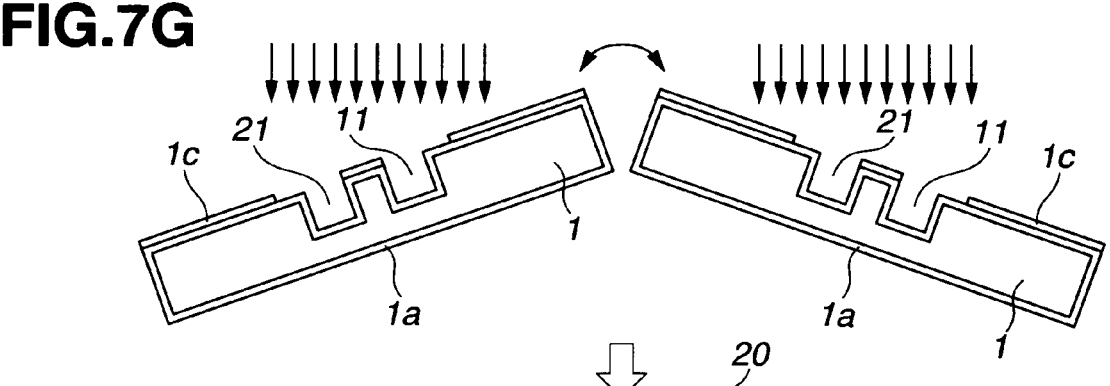
Figure 7H:
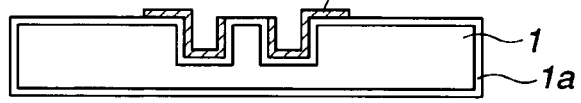
Figure 7I:
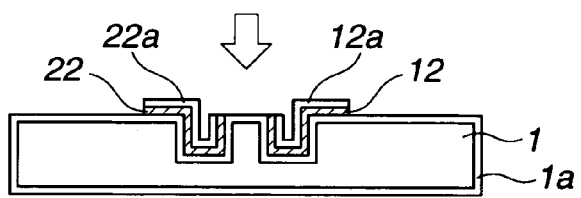
Figure 7J:
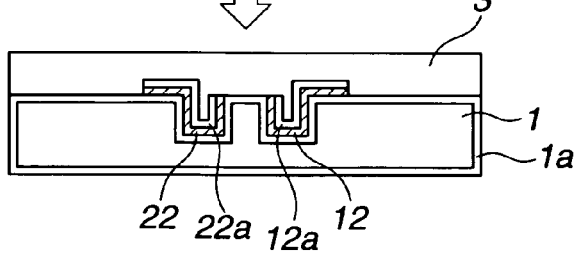

Next, as shown in FIGS. 7F to 7H, a resist pattern 1c for patterning metal electrodes and interconnections is applied, Ti as a bond layer and Au as a current collecting metal are deposited by vacuum electron beam (EB) evaporation, to form a current collector layer 20, and those portions of the resist and the metal other than the pattern are removed by a lift-off technique (lithography or dry film, metal deposition, and lift-off steps). It is noted that in the metal deposition step, the substrate is swung to the right and left as shown in FIG. 7G in order to ensure effective deposition on the side walls of the grooves. Then, as shown in FIG. 7I, catalysts 12a and 22a are applied onto the current collector layer sections 12 and 22 (serving as electrodes) within the grooves by electrodeposition (catalyst deposition step). Finally, as shown in FIG. 7J, an electrolyte membrane 3 is laid to complete a cell (membrane overlay step). It is noted that the substrate and the electrolyte membrane can be joined tightly by compressing them in the stacked state.

A ultra-compact-size fuel cell can be manufactured by a simple process involving forming channels in a substrate for flowing the fuel and oxidant liquids, depositing electrodes, and overlaying an electrolyte membrane. Using a micro electro mechanical system (MEMS) prevailing in the silicon microfabrication technology, the fuel cell can be manufactured by a similar process to the well-known semiconductor fabrication. This reduces the cost of mass-scale production. When cells are constructed by forming adjacent grooves in a common substrate surface, the manufacturing process becomes simpler, leading to a further reduction of the production cost.

EXAMPLE

Examples and Comparative Examples are given below for further illustrating the invention although the invention is not limited thereto.

Examples 1-4 and Comparative Example 1

Figure 8:
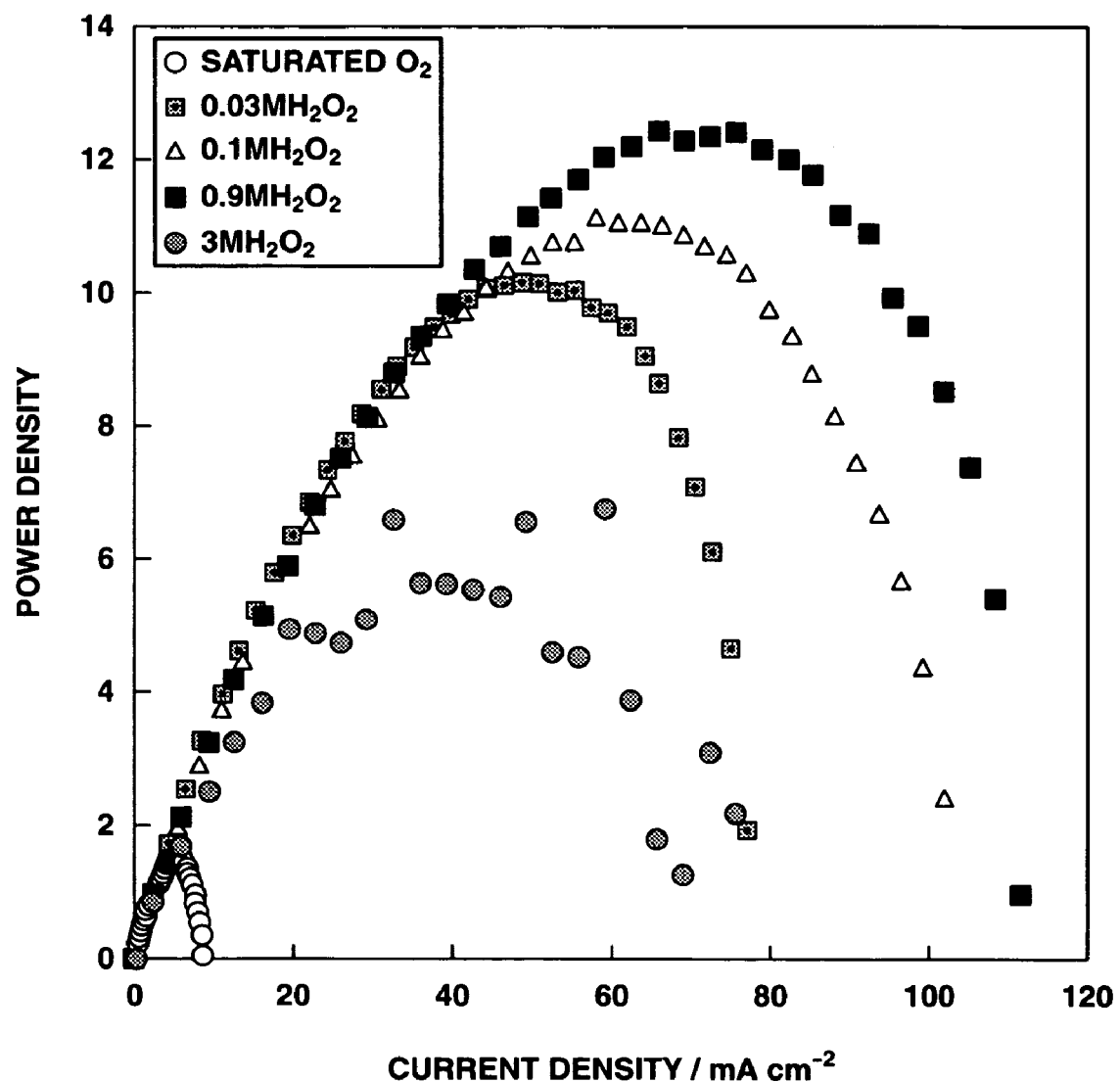
FIG. 8 is a graph (I-P curve) plotting power density versus current density, illustrating the power generation characteristics of fuel cells of Examples and Comparative Example.
Figure 9:
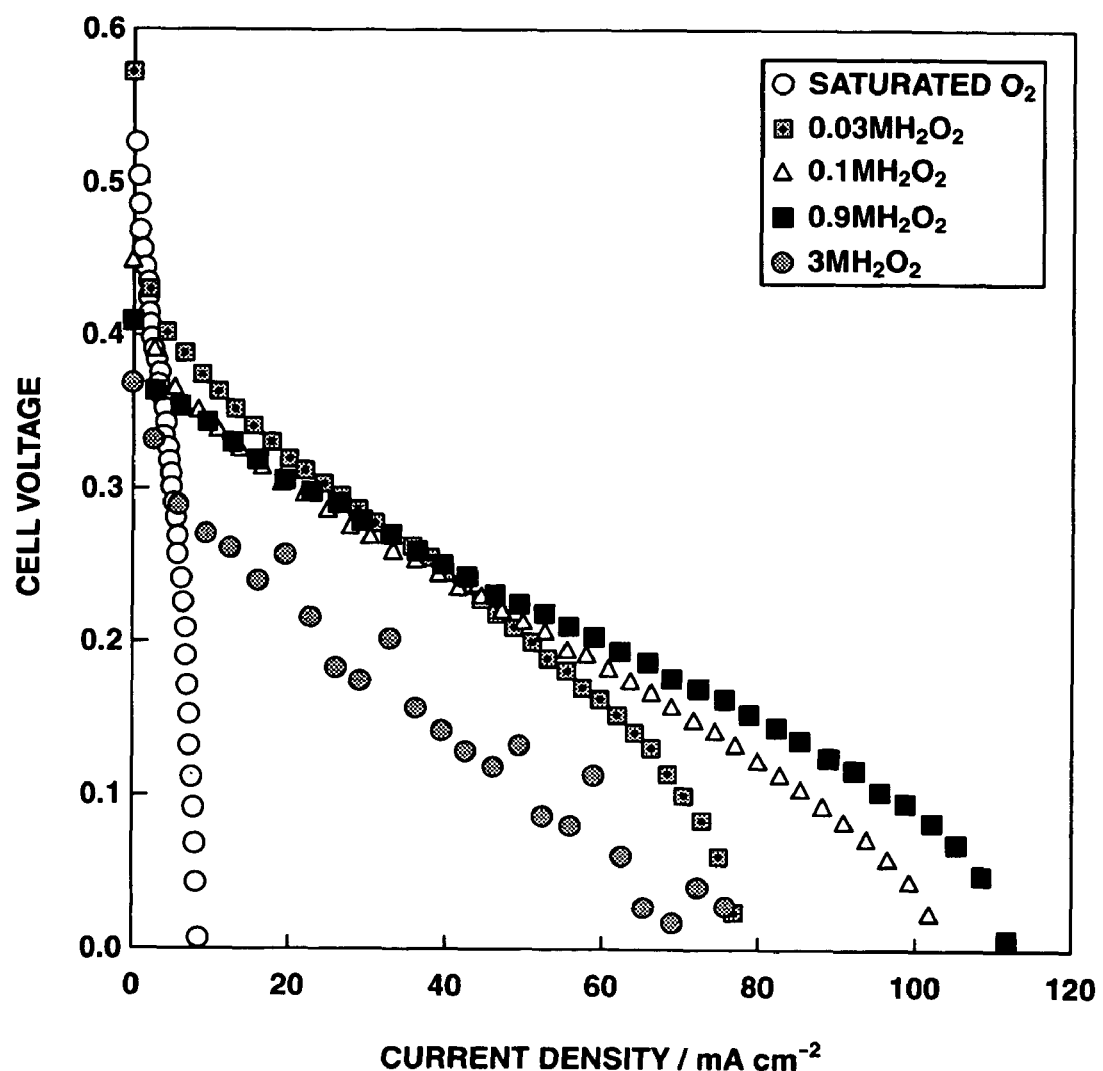
FIG. 9 is a graph (I-V curve) plotting cell voltage versus current density, illustrating the power generation characteristics of fuel cells of Examples and Comparative Example.
Figure 10:
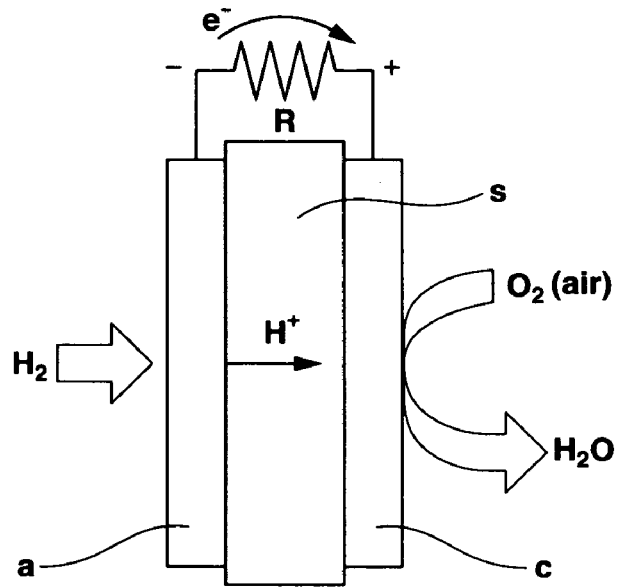
FIG. 10 schematically illustrates a prior art PEFC.
Figure 11:
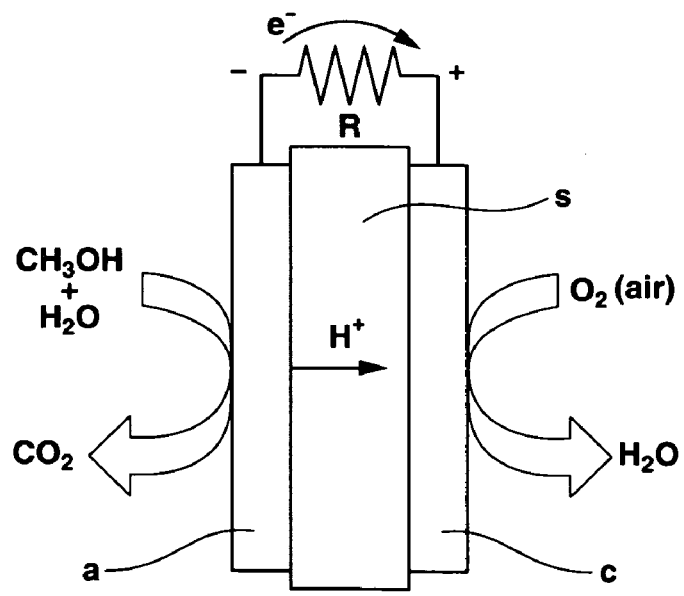
FIG. 11 schematically illustrates a prior art DMFC.

Fuel cells of the construction shown in FIG. 1 were assembled. Using an aqueous hydrogen peroxide solution (Examples) or an aqueous saturated oxygen dissolved solution (Comparative Example) as the oxidant liquid, the fuel cells were evaluated for performance. The results are shown in Table 1 and FIGS. 8 and 9. The conditions selected for the construction and evaluation are given below.

Substrate and Grooves
  Substrate: silicon substrate of 2 cm×2.5 cm×200 µm thick
  Grooves: width 100 µm depth 50 µm
    cross-sectional area 0.005 mm$^2$
    length 6 mm
  Groove-to-groove distance: 50 µm
  Single electrode area: 0.0091 cm$^2$ Electrolyte Membrane
  Nafion® 112 (51 µm thick) by DuPont Current Collector and Catalyst
  Anode: Au current collector+Pt—Ru catalyst (Pt=1.5 C/cm$^2$+Pt—Ru=1 C/cm$^2$)
  Cathode: Au current collector+Pt catalyst (Pt=2 C/cm$^2$)
    It is noted that the catalyst was applied by electroplating (pulse plating).

Fuel Liquid
  2 mol/L $CH_3OH$+0.5 mol/L $H_2SO_4$ aqueous solution
  Flow rate: 80 µL/min Oxidant Liquid
  (1) $H_2O_2$ (concentration shown in Table 1)+0.5 mol/L $H_2SO_4$ aqueous solution
  (2) $O_2$ (saturated)+0.5 mol/L $H_2SO_4$ aqueous solution
  Flow rate: 80 µL/min (corresponding to 16 ml/min per mm$^2$ of groove cross-sectional area)

TABLE 1

| | Oxidant and concentration | Maximum power density (mW/cm$^2$) | Current density at voltage 0 volt (mA/cm$^2$) |
|---|---|---|---|
| Example 1 | $H_2O_2$ 0.03 mol/L | 8.86-10.2 | 76.9-81.3 |
| Example 2 | $H_2O_2$ 0.1 mol/L | 11.0 | 101.6 |
| Example 3 | $H_2O_2$ 0.9 mol/L | 12.4 | 111.6 |
| Example 4 | $H_2O_2$ 3 mol/L | 5.67 | 75.4 |
| Comparative Example 1 | saturated dissolved $O_2$ $1.34 \times 10^{-3}$ mol/L | 0.934-1.56 | 8.28-8.58 |

As is evident from the results, the fuel cells of the invention using aqueous hydrogen peroxide solution as the oxidant liquid are significantly improved in current density and power density over the prior art fuel cell using aqueous saturated oxygen dissolved solution as the oxidant liquid. Fuel cells with superior performance have been demonstrated.

Japanese Patent Application No. 2005-259469 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fuel cell comprising
  a substrate having first and second grooves formed in juxtaposition, the grooves each having an opening and an inner wall,
  an electrolyte membrane lying on the substrate so as to cover the openings of the first and second grooves to define first and second flow channels, and
  catalyst-bearing current collector layer sections disposed on the inner wall of the first groove or the inside surface of the electrolyte membrane defining the first channel and the inner wall of the second groove or the inside surface of the electrolyte membrane defining the second channel, respectively,
  wherein a fuel liquid flows through the first channel to undergo anodic reaction, an oxidant liquid flows through the second channel to undergo cathodic reaction, hydrogen ions migrate from the first channel to the second channel through the electrolyte membrane, said first and second grooves have a width of up to 1,000 µm and a depth of up to 1,000 µm, the oxidant liquid is an aqueous hydrogen peroxide solution, said aqueous hydrogen peroxide solution has a hydrogen peroxide concentration of 0.03 to 3mol/L, and said aqueous hydrogen peroxide solution flows through the second channel at a flow rate of 1 to 50 ml/min per square millimeter of the channel cross-sectional area.

2. The fuel cell of claim 1, wherein the catalyst-bearing current collector layer sections are disposed on the inner wall of the first groove and the inner wall of the second groove, respectively, and the fuel liquid and the oxidant liquid come in direct contact with the electrolyte membrane.

3. The fuel cell of claim 1, wherein said substrate is a silicon or resin substrate.

4. The fuel cell of claim 1, wherein said first and second grooves have a width of up to 100 µm and a depth of up to 50 µm.

5. The fuel cell of claim 1, wherein said catalyst is a metal catalyst.

6. The fuel cell of claim 5, wherein said metal is platinum or platinum alloy.

7. The fuel cell of claim 1, wherein said fuel liquid is selected from the group consisting of methanol, ethanol, propyl alcohol, butanol, mixtures comprising at least one of the foregoing alcohols, and aqueous solutions of at least one of the foregoing alcohols.

8. The fuel cell of claim 1, wherein said aqueous hydrogen peroxide solution flows through the second channel at a flow rate of 16 to 50 ml/min per square millimeter of the channel cross-sectional area.

9. A fuel cell comprising
  a first substrate having a first groove formed therein and having an opening and an inner wall,
  a second substrate having a second groove formed therein and having an opening and an inner wall,
  an electrolyte membrane sandwiched between the first and second substrates with their grooves opposed to each other, so that the membrane defines first and second channels with the first and second grooves, respectively, and catalyst-bearing current collector layer sections disposed on the inner wall of the first groove or the inside surface of the electrolyte membrane defining the first channel and the inner wall of the second groove or the inside surface of the electrolyte membrane defining the second channel, respectively, wherein a fuel liquid flows through the first channel to undergo anodic reaction, an oxidant liquid flows through the second channel to undergo cathodic reaction, hydrogen ions migrate from the first channel to the second channel through the electrolyte membrane, said first and second grooves have a width of up to 1,000 μm and a depth of up to 1,000 μm, the oxidant liquid is an aqueous hydrogen peroxide solution, said aqueous hydrogen peroxide solution has a hydrogen peroxide concentration of 0.03 to 3mol/L, and said aqueous hydrogen peroxide solution flows through the second channel at a flow rate of 1 to 50 ml/min per square millimeter of the channel cross-sectional area.

10. The fuel cell of claim 9, wherein the catalyst-bearing current collector layer sections are disposed on the inner wall of the first groove and the inner wall of the second groove, respectively, and the fuel liquid and the oxidant liquid come in direct contact with the electrolyte membrane.

11. The fuel cell of claim 9, wherein said substrate is a silicon or resin substrate.

12. The fuel cell of claim 9, wherein said first and second grooves have a width of up to 100 m and a depth of up to 50 μm.

13. The fuel cell of claim 9, wherein said catalyst is a metal catalyst.

14. The fuel cell of claim 13, wherein said metal is platinum or platinum alloy.

15. The fuel cell of claim 9, wherein said fuel liquid is selected from the group consisting of methanol, ethanol, propyl alcohol, butanol, mixtures comprising at least one of the foregoing alcohols, and aqueous solutions of at least one of the foregoing alcohols.

16. The fuel cell of claim 9, wherein said aqueous hydrogen peroxide solution flows through the second channel at a flow rate of 16 to 50 ml/min per square millimeter of the channel cross-sectional area.

* * * * *